June 9, 1953 J. W. MILLER 2,641,418
FISHING REEL
Filed April 25, 1947 3 Sheets-Sheet 2
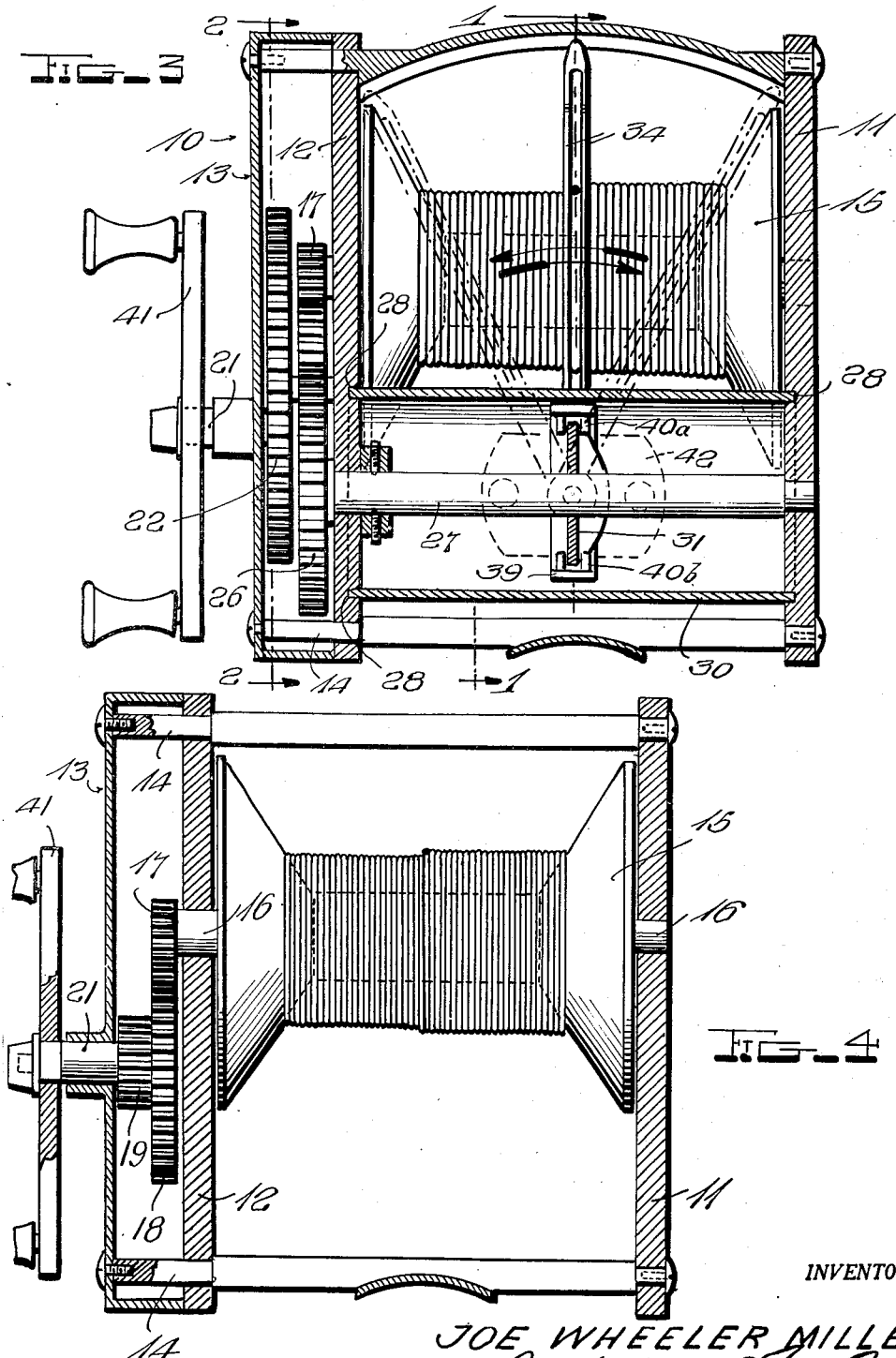
INVENTOR.
JOE WHEELER MILLER,
ATTORNEY

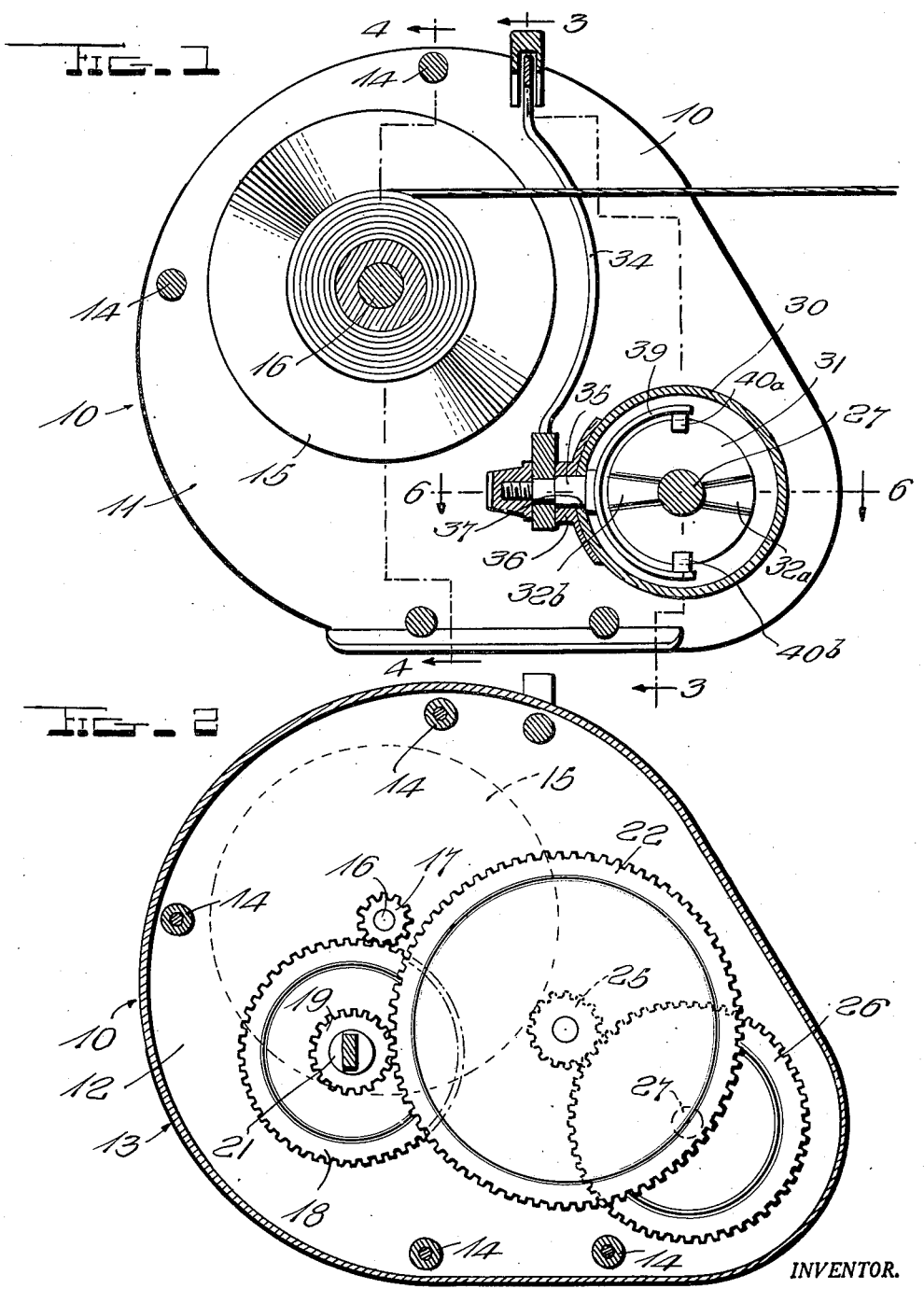

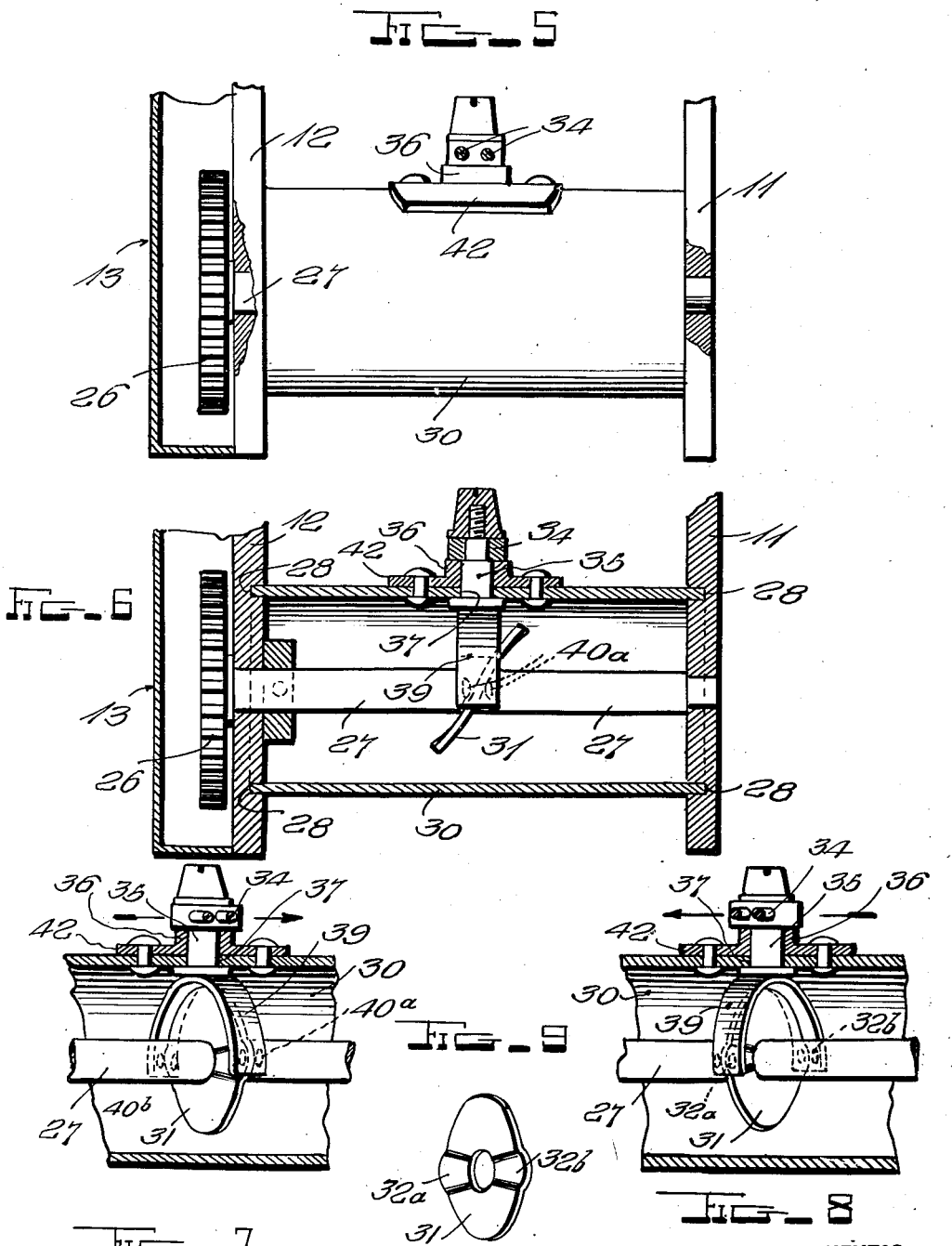

Patented June 9, 1953

2,641,418

UNITED STATES PATENT OFFICE 2,641,418

FISHING REEL

Joe Wheeler Miller, Port Orange, Fla.

Application April 25, 1947, Serial No. 743,740

4 Claims. (Cl. 242—84.4)

This invention relates to fishing reels and traverse mechanisms therefor and more particularly to a fishing reel construction embodying several novel aspects.

The primary object of the invention is to provide a simplified construction of fishing reel wherein the reel has an easy action and is of durable construction.

It is another object of the invention to provide for the positive control of the traversing mechanism in order to insure even distribution of the line.

It is another object of the invention to provide economical and durable means for protecting the actuating elements against fouling agents.

All of the above and other objects of the invention are accomplished in the mechanism particularly described hereinafter in the following detailed specification and drawings forming a part thereof.

Referring to the drawings wherein identical parts are indicated with similar reference numerals.

Fig. 1 is a side view partly in section of the device taken on line 1—1 of Fig. 3.

Fig. 2 is a sectional view showing the drive mechanism taken on line 2—2 of Fig. 3.

Fig. 3 is a sectional view taken substantially on line 3—3 of Fig. 1.

Fig. 4 is a vertical section taken substantially on line 4—4 of Fig. 1.

Fig. 5 is an enlarged detail.

Fig. 6 is a horizontal section taken substantially on line 6—6 of Fig. 1.

Fig. 7 is a sectional view showing the actuation of the traverse arm toward the right.

Fig. 8 shows the actuation of the traverse arm toward the left.

Fig. 9 is a detail perspective view of the cam disc.

Referring to the drawings a fishing reel 10 has a side wall 11 and an opposite side wall 12, the latter supporting an external gear box 13, the gear box and side walls being held in a rigid assembly as by bolts 14—14.

A spool 15 or drum is fixed to shaft 16, which carries small gear 17, meshing with gear 18 on shaft 21. Small gear 19 is also mounted on shaft 21 and co-acts with larger gear 22, and a gear 25 is carried by gear 22. Gear 26 is driven by gear 25, being fixed to shaft 27. Side walls 11 and 12 each are grooved at 28 to receive tubular shield 30 in such fashion that water and sand may be excluded from mechanism (hereinafter described) housed within shield 30.

An important feature of the invention is cam disc 31 which is fixed to shaft 27 midway between its ends, the disc being mounted thereon substantially at an angle of 35 degrees. It will be apparent that the cam disc will rotate with shaft 27 for the purpose of actuating means for traversing the line on spool 15 evenly, so as to avoid pile ups or irregularities thereon. The special design of cam disc 31 is characterized by a periphery which is normally smooth and regular; however, for a minor extent the periphery is provided with pronounced aberrations 32a and 32b. The aberrations are opposed at 180 degrees, and are equal in extent and reversed as to shape, aberration 32a being shaped to control the swing of the traverse means at an accelerated rate the same as aberration 32b. In a normal actuation the cam disc rotates with handle 41 and spool 15, the inclination of the cam disc moving the traverse means from right to left and reverse. Due to the aberrations 32a and 32b, however, at the extremity of its traverse, the traverse mechanism is speeded to completion and reverse. Due to such a speed-up and the circumstance that the gear ratio of the train of gears in gear box 13 is preferably substantially 16 to 1, the line is laid evenly across spool 15 without pile ups at either end.

A line distributing arm 34 or traverse arm is fixed to one end of shaft 35 rotatable in bearing 36, said shaft being coaxial with bearing 36 and aperture 37 in tubular shield 30. Shaft 35 extends at right angles with respect to shaft 27 and carries at its inner end semicircular yoke 39 fixed thereto. Yoke 39 terminates in a pair of spaced fingers 40a and 40b at each end, said fingers being parallel and perpendicular to shaft 27.

When handle 41 is turned so as to reel in the line, the train of gears is set in action and the spool is driven to take up the line. As described above, and as indicated by the arrows in Fig. 3, the traverse arm is driven to swing to the right or to the left as the case may be with its pivot shaft 35. Bearing 36 is preferably integral with a mounting plate 42 which may be bolted or otherwise rigidly secured to tube 30. Shaft 35 swings the traverse arm as it rotates with the oscillation of semi-circular yoke 39, the pairs of spaced fingers 40a and 40b having smoothly surfaced inner areas 43 which closely engage the sides of cam disc 31 at its periphery but without binding thereon. The rotation of the cam disc with the driving of shaft 27 regularly smoothly and continuously controls the laying of the line across spool 15.

Another important aspect of the invention is the fact that the traversing drive elements are enclosed within tube 30, which being received for seating in side wall grooves 28, effectively excludes grit, sand, water and other fouling agents.

Although preferably the ratio of spool to cam disc may be substantially 16 to 1 at all times when either reeling in or paying out the strand or line, it will be understood that the strand moves slower when the line is out and the spool is low, and rapidly when the line is in and the line level on the spool is high. However on devices of the type and relative dimensions of fishing reels, such well understood variation of line traverse speed, it has been found, does not interfere with the functioning of this construction in smoothly and evenly guiding the deposit of the line across the spool without pile-ups at each end of the spool. The inclination of the present inner spool walls alines with the inclination of the distributing finger 34 at each end of its traverse, and the opposed aberrations or grooves of the cam disc, being located at diametrically opposite points on the periphery of the cam disc throw the finger 34 when the finger enters its final substantially one-twelfth of its lateral movement to speed up its lateral movement to complete such lateral movement. By immediately subsequently also speeding up its return movement for the first substantially one-twelfth of its return movement, the finger 34 deposits the line smoothly and evenly across the spool without pileups, the fingers 40a and 40b moving out of the aberration on to the normal disc periphery as the finger 34 moves from its initial substantially one-twelfth portion of movement in the opposite direction in order that the speed of finger 34 will be reduced between its end speed-ups and move at a constant speed across the spool intermediate the ends. In such traverse, the line is laid compactly and smoothly as the fingers 40a and 40b follow the normal periphery of the inclined cam disc.

Although I have described herein above a preferred embodiment of the invention it will be apparent that many of the features disclosed are selections from the conventional and that the invention is not to be limited thereby but only by the scope of the appended claims.

What I claim is:

1. A fishing reel of the type having a frame, a spool supported for rotation in said frame to receive the line, traversing mechanism for the line supported in said frame, and a common drive means for said spool and traversing mechanism; in which said traversing mechanism comprises a line distributing member for feeding the line to said spool, means supporting said line distributing member in said frame for reciprocal movement lengthwise of said spool, and means supported in said frame and coacting with said line distributing member to impart reciprocal movement to the latter, said last named means comprising a cam and a cooperating cam follower, said cam having an operative cam surface of substantially uniform contour over the major portion of the length thereof and having a pronounced change in contour adjacent each end of its throw for imparting to said follower, and thereby to said line distributing member, a substantially uniform displacement over the major portion of the traverse thereof and a relatively rapid displacement adjacent each end of the traverse thereof at both sides of the point of reversal, whereby piling up of the line adjacent the ends of the spool is avoided.

2. A fishing reel as claimed in claim 1 in which the cam is a rotating axial cam having an operative face of which the major portion is of generally uniform axial pitch the terminal portions of such operative face having an axial pitch which is sharply increased relative to the said major portion, whereby axial displacement of the follower adjacent the points of reversal thereof is accelerated.

3. A fishing reel as claimed in claim 1 and including a housing for said cam, said housing being supported on said frame, said cam follower having a part extending through the housing wall.

4. In line traversing mechanism for fishing reels the combination with a frame, of a spool supported for rotation in said frame, a line distributing member supported for reciprocal movement on said frame in cooperative relation with said spool, a cam follower operatively connected to said member, and a cam supported for rotation in said frame and having a cam surface engaging said follower, said cam surface having a contour such that said line distributing member is displaced at a substantially uniform rate over the major portion of its throw and at an accelerated rate adjacent each end of its throw at both sides of the point of reversal, whereby piling up of the line at the ends of the spool is avoided.

JOE WHEELER MILLER.

References Cited in the file of this patent

UNITED STATES PATENTS

| Number | Name | Date |
|---|---|---|
| 326,092 | Crandal | Feb. 16, 1886 |
| 828,969 | Rhodes | Aug. 21, 1906 |
| 1,426,594 | Oltsch | Aug. 22, 1922 |
| 1,507,404 | Welch | Sept. 2, 1924 |
| 1,928,365 | Anderson | Sept. 26, 1933 |
| 2,027,306 | Maynes | Jan. 7, 1936 |
| 2,181,441 | Traphagen | Nov. 28, 1939 |
| 2,244,889 | Maynes | June 10, 1941 |
| 2,377,996 | Coleman | June 12, 1945 |
| 2,461,884 | Elsinger | Feb. 15, 1949 |

FOREIGN PATENTS

| Number | Country | Date |
|---|---|---|
| 11,036 | Great Britain | of 1903 |